United States Patent [19]

Sadow

[11] Patent Number: 5,564,538
[45] Date of Patent: Oct. 15, 1996

[54] WHEELED CARRY-ON CASE

[75] Inventor: Bernard D. Sadow, Chappaqua, N.Y.

[73] Assignee: Outrigger, Inc., Chappaqua, N.Y.

[21] Appl. No.: 397,613

[22] Filed: Mar. 2, 1995

[51] Int. Cl.⁶ .............................. A45C 5/14; A45C 13/26
[52] U.S. Cl. ........................ 190/18 A; 190/39; 190/115; 280/37
[58] Field of Search ..................... 190/18 A, 39, 190/115; 280/37, 655, 655.1; D3/279

[56] References Cited

U.S. PATENT DOCUMENTS

| | | | |
|---|---|---|---|
| 3,606,372 | 9/1971 | Browning | 190/115 X |
| 4,261,447 | 4/1981 | Arias et al. | 190/18 A |
| 4,759,431 | 7/1988 | King et al. | 190/18 A |
| 4,982,820 | 1/1991 | Scott | 190/18 A X |
| 5,197,579 | 3/1993 | Bieber et al. | 190/18 A |
| 5,228,546 | 7/1993 | Chang et al. | 190/18 A |
| 5,230,408 | 7/1993 | Sadow | 190/18 A X |
| 5,339,934 | 8/1994 | Liang | 190/18 A |
| 5,351,792 | 10/1994 | Cohen | 190/18 A |
| 5,377,795 | 1/1995 | Berman | 190/18 A |
| 5,407,039 | 4/1995 | Alper et al. | 190/18 A |

FOREIGN PATENT DOCUMENTS

| | | | |
|---|---|---|---|
| 5879 | 12/1979 | European Pat. Off. | 190/18 A |
| 2409720 | 7/1979 | France | 190/18 A |
| 2005520 | 9/1971 | Germany | 190/18 A |
| 587630 | 5/1977 | Switzerland | 190/18 A |
| 693373 | 7/1953 | United Kingdom | 190/18 A |

Primary Examiner—Sue A. Weaver
Attorney, Agent, or Firm—Abelman, Frayne & Schwab

[57] ABSTRACT

A wheeled carry-on case has a rigid base and a guide extending perpendicular to said base in which a retractable handle is slidably received, the base having wheels positioned along the major dimension of the base at one edge thereof, and having wheels positioned at spaced positions along at least one of the minor dimensions of the base, thus permitting the case to be wheeled over a ground surface in a direction perpendicular to a front and rear of the case, and also, in a direction extending parallel to the front and rear wall of the case.

8 Claims, 1 Drawing Sheet 5,564,538

WHEELED CARRY-ON CASE

FIELD OF THE INVENTION

This invention relates to improvements in articles of wheeled luggage commonly known as a carry-on case. Such cases commonly are used by air travelers in the transportation of personal property to the aircraft, the case after boarding of the passenger being stored in an over head luggage compartment.

BACKGROUND OF THE INVENTION

Wheeled carry-on cases are well known in the art, those cases incorporated a retractable handle, that when extended can be employed for guiding the case or towing of the case, the case being provided with ground-engaging wheels to permit it to be traversed over a ground surface.

Such cases incorporate a retractable handle positioned adjacent that face of the carry-on case that is provided with the ground-engaging wheels.

However, once the passenger has boarded an aircraft and is towing the carry-on case, the passenger must then reorient the case to 90° to permit the case to be carried up the passenger aisle of the aircraft prior to its storage in a storage compartment of the aircraft.

Aisleways of aircrafts are narrow, and commonly present an interrupted surface over which the case must be carried.

OBJECT OF THE INVENTION

It is an object of this invention to provide a carry-on case, which is capable of wheeled movement in direction perpendicular to the front and rear face of the carry-on case, and, which also is capable of wheeled movement in directions transverse thereto in a plane substantially parallel to the front and rear face of the carry-on case.

Additionally, it is an object of this invention to provide a wheeled carry-on case having two major internal compartments that can be independently accessed by the user of the case.

SUMMARY OF THE INVENTION

According to the present invention, a wheeled carry-on case includes a rigid base that provides a rigid support for a guide in which a retractable handle is received in sliding relation. Optionally, the remaining side walls of the case also can be formed of a substantially rigid material to provide a case having what is commonly known as a "hard" frame.

The major longitudinal edge of the base is provided with two ground-engaging wheels. The two minor longitudinal edges of the base each are provided with two ground-engaging wheels.

The open side faces of the frame each are closed by a panel of fabric material that is detachably attachable to the frame by conventional zippers.

Optionally, the retractable handle of the case can be rotated through 90° in order to facilitate forwards or sideways movement of the case.

In this manner, the case can be moved forwardly on the ground-engaging wheels by pulling forwards on the handle in order to tilt the case onto the ground-engaging wheels, or, the case can be moved sideways by similarly tilting the case to bring the ground-engaging wheels at the minor dimension of the base into contact with the ground surface, tilting of the case in that direction resulting in the ground-engaging wheels at the major dimension of the base being lifted off the ground surface, as are the wheels on the minor dimension of the base at the opposite side of the case.

A rigid central partition is provided within the case, thus providing two separate compartments that are separately accessible by the user, this representing a great convenience to the user.

Either or both side panels of the case can be provided with external pouches.

DESCRIPTION OF THE DRAWINGS

The invention will now be described with reference to the accompanying drawings, in which.

DESCRIPTION OF THE PREFERRED EMBODIMENTS

Figure 1:
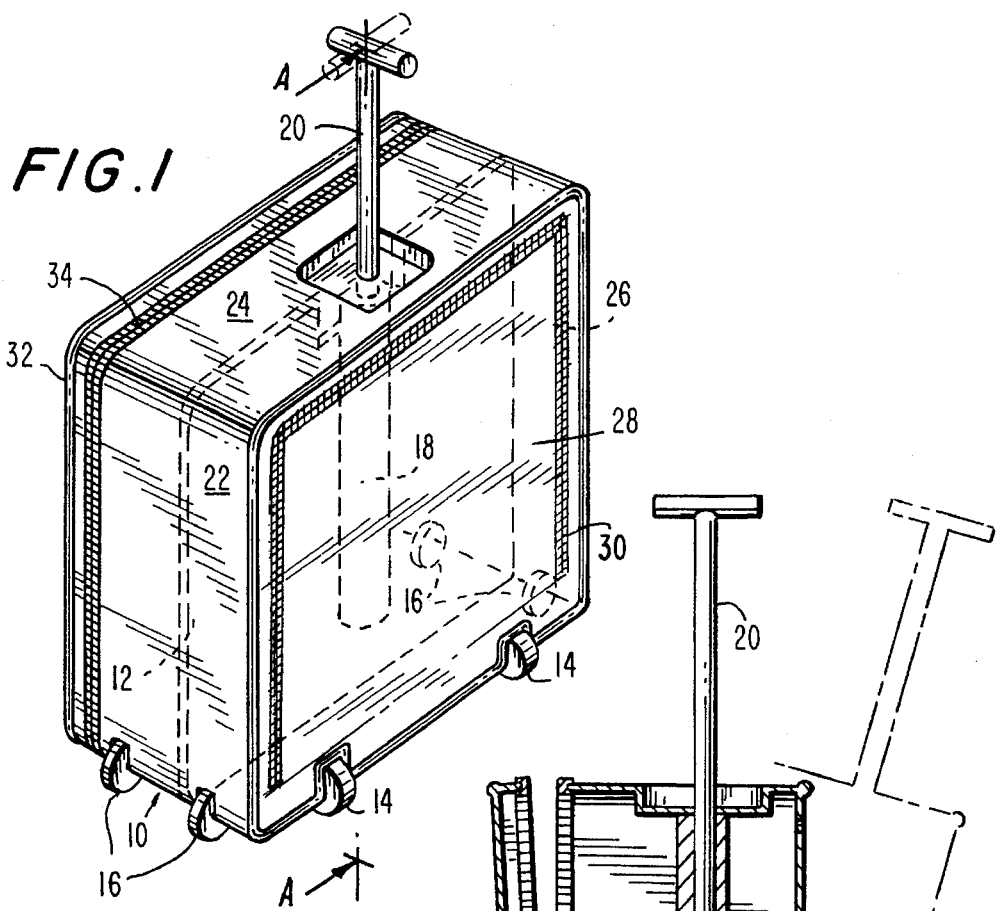
FIG. 1 is a perspective view of the wheeled carry-on case.
Figure 2:
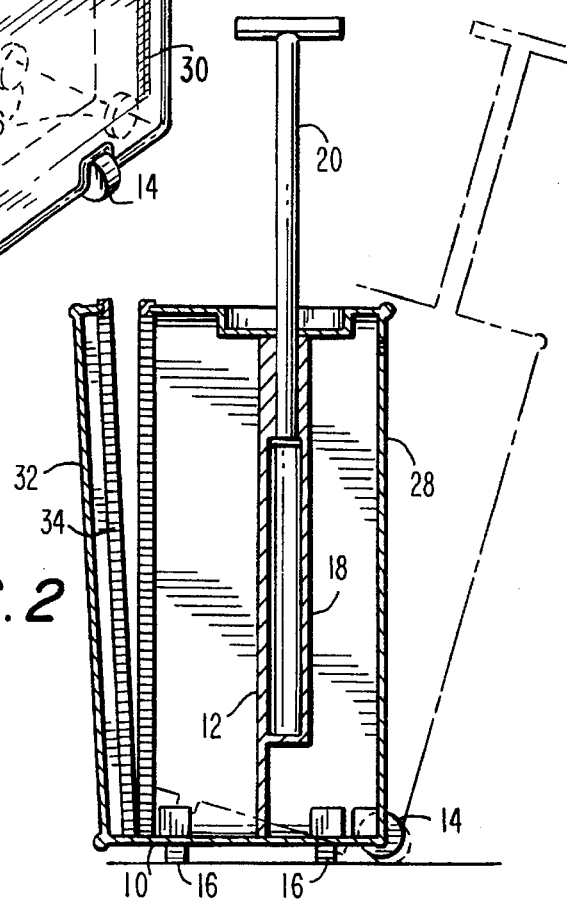
FIG. 2 is a cross-section through the case taken on the line A—A, in FIG. 1; and, FIG. 3 is a plan view of an alternative form of the towing handle illustrated in FIGS. 1 and 2.

The wheeled carry-on case of the present invention includes a base 10 formed from a substantially rigid material, and a partition 12, of a substantially rigid material that extends perpendicular to the base in the direction of the length of the base, i.e., the major dimension of the base, and provides two major compartments with the case.

Wheels 14 are journaled on the base at spaced positions along one of the major dimensions of the base. Wheels 16 are journaled on the base at spaced positions along both of the minor dimensions of the base.

A guide tube 18 is rigidly secured to the central partition 12, and, a retractable handle 20 is slidedly received within the guide tube 18, any suitable means being provided for limiting the extent to which the retractable handle can be withdrawn from the guide tube 18.

The remaining side walls 22, 24, 26 can be of any convenient construction, i.e., they can be formed from flexible fabric material, but preferably, and in order to provide stability to the partition 12, they are formed as substantially rigid members, thus to provide a substantially rigid perimeter to the case.

One side of the case is closed by a selectively removable wall 28 that is attached to the body of the case by a zipper 30.

The opposite wall 32, similarly is attached to the body of the case by a zipper 34.

In use of the case, when the user desires to move the case forwardly over a ground surface in a direction perpendicular to the front wall 28, the user merely extends the handle 20 out of the guide 18, and the angles the case for its weight to be positioned over the wheels 14.

If, now, the user must move the case laterally in order to negotiate an aisle in an aircraft or other narrow space, the user then extends the handle 20 and tilts the case in the direction of one of the pairs of wheels 16 to engage that pair of wheels with the ground surface. The user can then either push or pull the case laterally along the aisleway.

Preferably the handle 20 can be rotated within the guide 18 between two positions spaced 90° from each other, whereby the handle is either presented as extending parallel to the front wall 28 and longitudinally of the side wall 24, or, the handle can then be rotated for it to extend perpendicular to the side wall 28.

As is common in the art, side pouches can be provided on either of the front wall and opposite wall 28 and 32, this providing an increased capacity of the case of the invention over commonly known cases.

Conveniently, the bottom wall 10 and the side walls 22–26 can be formed integrally with each other as a shell of the case, subsequent to which the partition 12 is rigidly attached to each of the base 10 and side walls 22–26, thus to provide an I-beam construction of the case presenting considerable strength and rigidity.

Figure 3:
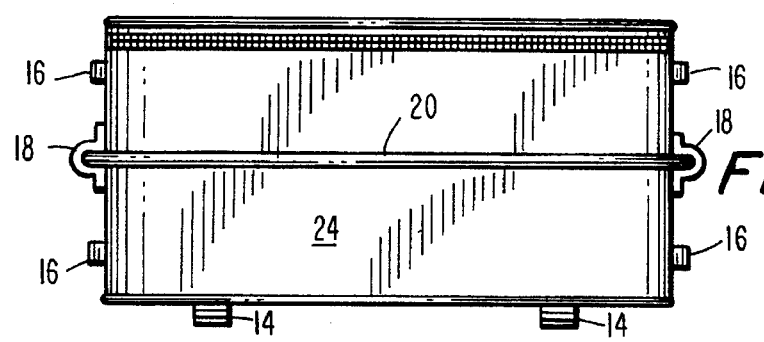

While a single tubular guide has been shown in the drawings, equally well dual tubular guides 18 can be provided as shown in FIG. 3, in order to accommodate an extendable handle of U-shape. In that instance, the guides 18 do not need to be positioned interiorly of the case, but, instead can be positioned exteriorly of the case as indicated in FIG. 3, this further increasing the carrying capacity of the case.

Further constructional details will present themselves to persons skilled in the art.

I claim:

1. A wheeled case, including:

a substantially rectangular and substantially rigid base member having side edges comprising a major dimension of said base member, and having other side edges comprising a minor dimension of said base member;

wheels journaled on said base member at spaced positions along said major dimension of said base member at one side edge thereof, and wheels journaled on said base member at spaced positions along both said side edges comprising said minor dimension of said base member, whereby said wheeled case may be moved in first and second directions perpendicular to said major dimension of said base member and in third and fourth directions perpendicular to said minor dimension of said base member;

a guide extending perpendicular to said base member;

a retractable handle slidably received within said guide;

side walls of said case respectively connected to said base member and to each other to provide a continuous side wall of said case;

means rigidly securing said guide to said base member, said means being rigidly connected to each of said side walls; and closure panels connected to said base and connectable to said side walls, said closure panels providing a front and a rear wall of said case.

2. The wheeled case of claim 1, in which said side walls each are comprised of substantially rigid material.

3. The wheeled case of claim 2, in which said side walls are formed integrally with said base member to provide a substantially rigid shell of said wheeled case.

4. The wheeled case of claim 1, in which said means rigidly securing said guide to said base member comprise a partition of substantially rigid material secured to said base member and extending perpendicular thereto.

5. The wheeled case of claim 4, in which said partition provides a substantially rigid support for said guide.

6. The wheeled case of claim 5, in which each of said base member and said side walls are formed of substantially rigid material, and said substantially rigid partition member is rigidly connected to each of said base member and side walls.

7. The wheeled case of claim 1, in which said retractable handle is rotatable within said guide by an angular extent of at least 90°.

8. The wheeled case of claim 1, including dual said guides respectively secured to opposite said side walls of said case, and a handle having legs respectively slidably received within said guides.

* * * * *